United States Patent
Brase et al.

(10) Patent No.: US 8,337,303 B2
(45) Date of Patent: Dec. 25, 2012

(54) LIGHT DISPLAY FOR A VIDEO GAME DEVICE

(75) Inventors: Kevin Brase, Corinth, TX (US); Chris Park, Fo Tan (HK); Feynman Ko, Fanling (HK); Stephen Luk, Fo Tan (HK); Vincent Chiu, Kowloon (HK); Lewis Tong, Tsing Yi (HK)

(73) Assignee: Mattel, Inc., El Segundo, CA (US)

( * ) Notice: Subject to any disclaimer, the term of this patent is extended or adjusted under 35 U.S.C. 154(b) by 552 days.

(21) Appl. No.: 11/056,898

(22) Filed: Feb. 11, 2005

(65) Prior Publication Data

US 2005/0201095 A1 Sep. 15, 2005

Related U.S. Application Data

(60) Provisional application No. 60/544,594, filed on Feb. 13, 2004.

(51) Int. Cl.
*G06F 17/00* (2006.01)
(52) U.S. Cl. ............................. 463/31; 463/30
(58) Field of Classification Search ............... 463/47, 463/36, 30, 31
See application file for complete search history.

(56) References Cited

U.S. PATENT DOCUMENTS

| | | | |
|---|---|---|---|
| 3,376,429 A * | 4/1968 | Ziolkowski et al. .......... 307/141 |
| 3,704,374 A * | 11/1972 | Kaufman ................. 250/214 AL |
| 5,115,383 A | 5/1992 | Lee |
| 6,494,786 B2 | 12/2002 | Oshita |
| 6,575,583 B2 | 6/2003 | Suzuki et al. |
| 7,121,944 B2 * | 10/2006 | Gauselmann ................... 463/30 |
| 2002/0047237 A1 | 4/2002 | Oshita |
| 2002/0118182 A1* | 8/2002 | Luther Weindorf .......... 345/204 |
| 2002/0173354 A1 | 11/2002 | Winans et al. |
| 2003/0064799 A1 | 4/2003 | Goins et al. |
| 2003/0109304 A1 | 6/2003 | Gauselmann |
| 2003/0214242 A1 | 11/2003 | Berg-johansen |
| 2004/0190282 A1 | 9/2004 | Hussaini et al. |

FOREIGN PATENT DOCUMENTS

| | | |
|---|---|---|
| EP | 1227642 | 7/2002 |
| WO | WO 00/41378 | 7/2000 |

OTHER PUBLICATIONS

"Front Light Screen"—Feb. 2, 2004; 1 page; http://www.gameboy.com/sp/hardware_feature.html?hardId=2.
"GBA Afterburner Pack SP0 2"—Feb. 13, 2004; 3 pages; http://www.lik-sang.com/info.php?category=6&products_id=2421&PHPSESSID=cd4b9cef91 . . . .

(Continued)

*Primary Examiner* — Michael Cuff
(74) *Attorney, Agent, or Firm* — Edell, Shapiro & Finnan LLC

(57) ABSTRACT

An electronic device and method of illuminating a display are provided. The electronic device includes a display device, an illumination device, a light sensor and a processor coupled to the illumination device and the light sensor. The processor receives a light value from the light sensor, determines a target illumination value based at least partly on the light value, and causes the illumination device to illuminate the display device at substantially the target illumination value. In one embodiment, the processor causes the illumination device to illuminate the display device at substantially the target illumination value by gradually increasing a current illumination value. In another embodiment, the processor causes the illumination device to illuminate the display device at substantially the target illumination value by gradually decreasing a current illumination value.

15 Claims, 5 Drawing Sheets

OTHER PUBLICATIONS

"GBA Afterburner internal light"—Feb. 13, 2004; 3 pages; http://www.gameboy-advance.net/accessories/gba_afterburner_internal_light.htm.

"Hot Products in GameBoy"—Feb. 13, 2003; 3 pages; http://www.lik-sang.com/list.php?category=6&AID=3885654&PID=1197244.

"The Lik-Sang.com products FAQ"—Feb. 13, 2004; 9 pages; http://www.lik-sang.com/faq.php?browse=1&products_id=2421&categories_id=6&.

"CNN Money Article"—Feb. 13, 2004; 2 pages; http://www.gamecubicle.com/news-nintendo_gamecube_backlit_backlight_game_boy_advanc . . . .

"Triton Labs"—Feb. 13, 2004; 2 pages; http://www.tritonlabs.com/Merchant2/merchant.mv?

"Triton Labs"—Feb. 13, 2004; 2 pages; http://www.tritonlabs.com/Merchant2/merchant.mv?Screen=CTGY&Store_Code=TLAS&Cat . . . .

"Triton Labs"—Feb. 13, 2004; 2 pages; http://www.tritonlabs.com/Merchant2/merchant.mv?Screen=PROD&Store_Code=TLAS&Pro . . . .

Supplementary European Search Report from European Patent Application No. EP 05713283, dated Mar. 18, 2010, two pages.

\* cited by examiner

LIGHT DISPLAY FOR A VIDEO GAME DEVICE

This application claims the benefit of U.S. Provisional Application Ser. No. 60/544,594, filed Feb. 13, 2004, the entire contents of which are incorporated herein by reference.

FIELD OF THE INVENTION

The present invention relates to lighting device or lighting apparatus for a video game device and specifically, to a backlight device for a video game device that automatically adjusts the light intensity level of the display screen of the video game device to enable players to view and play a game displayed by the display screen in different lighting conditions.

BACKGROUND OF THE INVENTION

In the video game industry, there are several different types of video game devices. Certain video game devices or systems connect to a television set and operate games which are displayed on the television screen. Other video game devices are handheld devices which enable players to carry the devices with them and play games at different locations and in different settings. The handheld devices include video screens or video displays which display the games operated by these devices. Conventional video screens or video displays for the handheld devices typically include a Liquid Crystal Display (LCD) which displays the images of the games operated by the handheld devices.

One problem with conventional LCD's is that the LCD's are difficult to view in different lighting conditions such as in very low light or no light conditions. In these situations, players must move to a different area which has more favorable lighting conditions to view and play the games displayed by the LCD's of the handheld devices. As a result, players are limited by the lighting conditions of the particular location or place in which they are using the video game device and in some instances, the players are limited by the time of day which they can view and play the games operated by the handheld devices.

To overcome this problem, some conventional handheld devices include separate lights which are attachable to the handheld devices to illuminate the LCD displays and enable players to use the devices in low to no light conditions. Certain of these lights are separate external lights which are attached to a handheld device to project light down or at the LCD display of the device. Some of these external lights are connected to a cover or other similar panel which is attached adjacent to and over the LCD display. Other external lights are mounted to a bracket or arm which is attached to and extends above the console of the handheld device. The bracket or arm includes a light source at one end and positions the lights source above the LCD display. The light source emits light which projects down onto the LCD display similar to a book light. These lights tend to cause glares or reflections which affect the players' ability to view and play the games displayed on the LCD displays.

Certain other handheld devices employ an internal backlight device or system which includes one or more Light Emitting Diodes (LED's) to illuminate the LCD display. The backlight is installed between the LCD and the front protective lens of the handheld device. A switch or other control is typically connected to the backlight to control and adjust the brightness of the backlight and also to turn the backlight on and off. The internal backlight, however, requires complicated installation procedures. Additionally, the internal backlight requires that players manually adjust the control or switch each time they want to adjust the brightness level of the backlight device. If the ambient light conditions become darker while players are playing the handheld device, the players are forced to adjust the brightness or light intensity level of the backlight device while they are playing a game to adequately view the display of the handheld device. Adjusting the backlight in this manner interrupts a player's concentration level and affects the player's ability to play the game operated by the handheld device.

A further problem with these backlight devices is that the backlight devices illuminate the display screen to the highest or greatest light intensity level. The light intensity level can then be adjusted or modified using a control or switch which is manually adjusted by the player. However, if the player does not adjust the light intensity level or if the light intensity level consistently remains at a high level, the batteries or the stored energy used to power the video game device are depleted at a faster rate, resulting in less playing time.

Accordingly, there is a need for a lighting device for a video game device which automatically adjusts the light intensity of the video game display according to different lighting conditions and conserves the energy used to power the video game device.

SUMMARY OF THE INVENTION

In one embodiment of the present invention, an electronic device includes a display device, an illumination device, a light sensor and a processor coupled to the illumination device and the light sensor. The processor receives a light value from the light sensor, determines a target illumination value based at least partly on the light value, and causes the illumination device to illuminate the display device at substantially the target illumination value. In one embodiment, the processor causes the illumination device to illuminate the display device at substantially the target illumination value by gradually increasing a current illumination value. In another embodiment, the processor causes the illumination device to illuminate the display device at substantially the target illumination value by gradually decreasing a current illumination value.

In one embodiment, the processor determines the target illumination value if the processor determines the light value exceeds a preset value. In another embodiment, the processor determines the target illumination value if the processor determines the light value is less than a preset value. In still another embodiment, the target illumination value is selected from the group consisting of a minimum illumination value, a maximum illumination value, and an intermediate illumination value wherein the intermediate illumination value is between the maximum illumination value and the minimum illumination value.

In one embodiment, the processor determines the target illumination value by applying a mapping function. In another embodiment, the electronic device also includes an illumination level adjustment input device coupled to the processor. The processor determines a second illumination value based at least partly on an adjustment value received from the illumination level adjustment input device and causes the illumination device to illuminate the display device at substantially the second illumination value. In another embodiment, a mapping function maps the light value to the second illumination value. In still another embodiment, the electronic device is selected from the group consisting of a video game device, a handheld video game device, a personal digital assistant, a lap top computer, a cellular phone, a portable DVD player, and a computer.

In another embodiment, a video game device includes a housing, a display device mounted to the housing, an illumination device positioned adjacent to the display device, a light sensor mounted to the housing and in communication with the illumination device and a processor. The processor is operable to automatically activate the illumination device, cause the illumination device to gradually emit light until a designated light intensity level is achieved, cause the light sensor to detect the ambient light intensity level and modify the light intensity level of the light emitted by the illumination device to the designated light intensity level based on the detected ambient light intensity level.

Additional features and advantages of the present invention are described in, and will be apparent from, the following Detailed Description of the Invention and the figures.

DETAILED DESCRIPTION OF THE INVENTION

Figure 1:
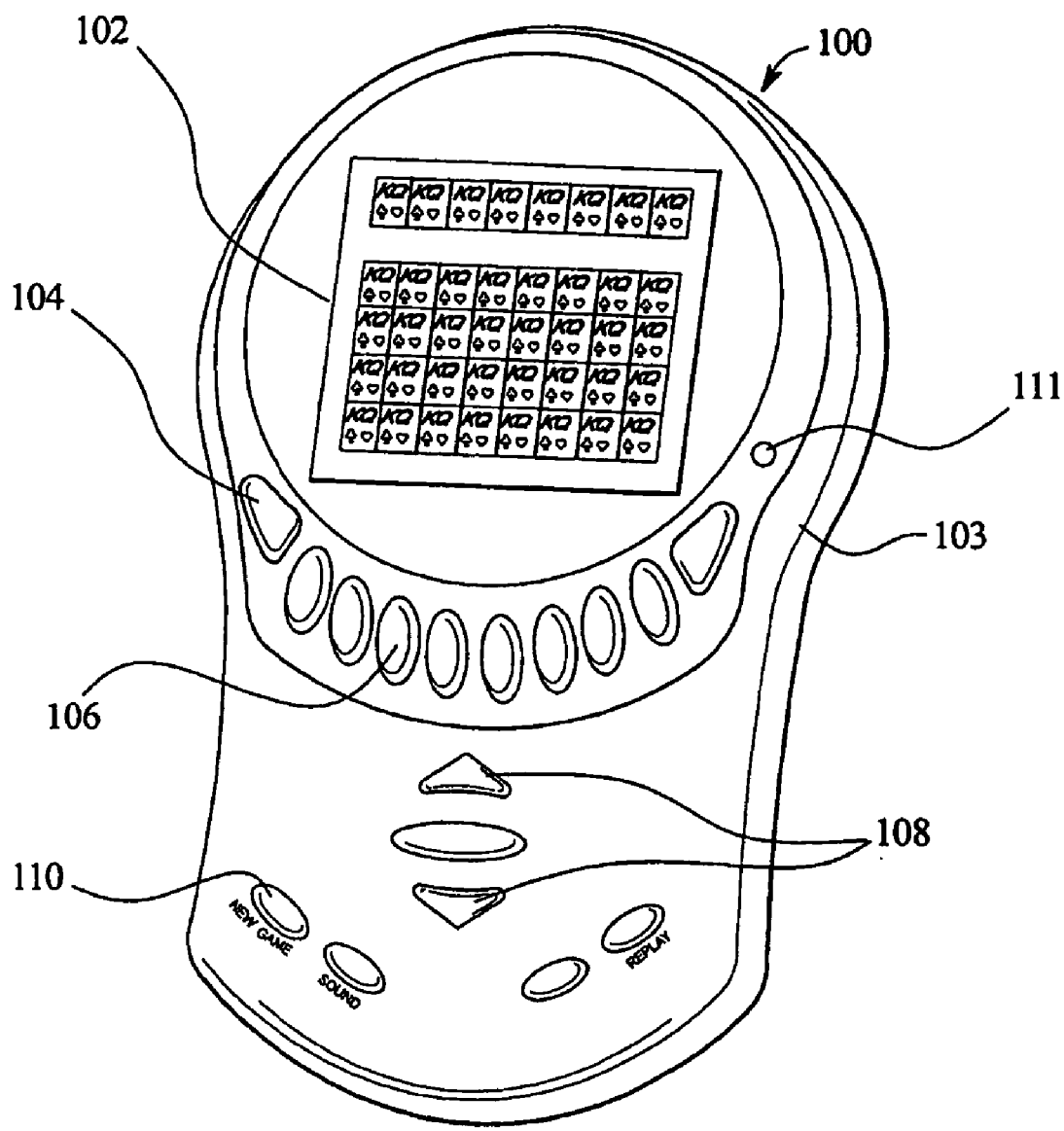
FIG. 1 is a perspective view of a handheld video game device including a video display employing a light display in accordance with one embodiment of the present invention.
Figure 2:
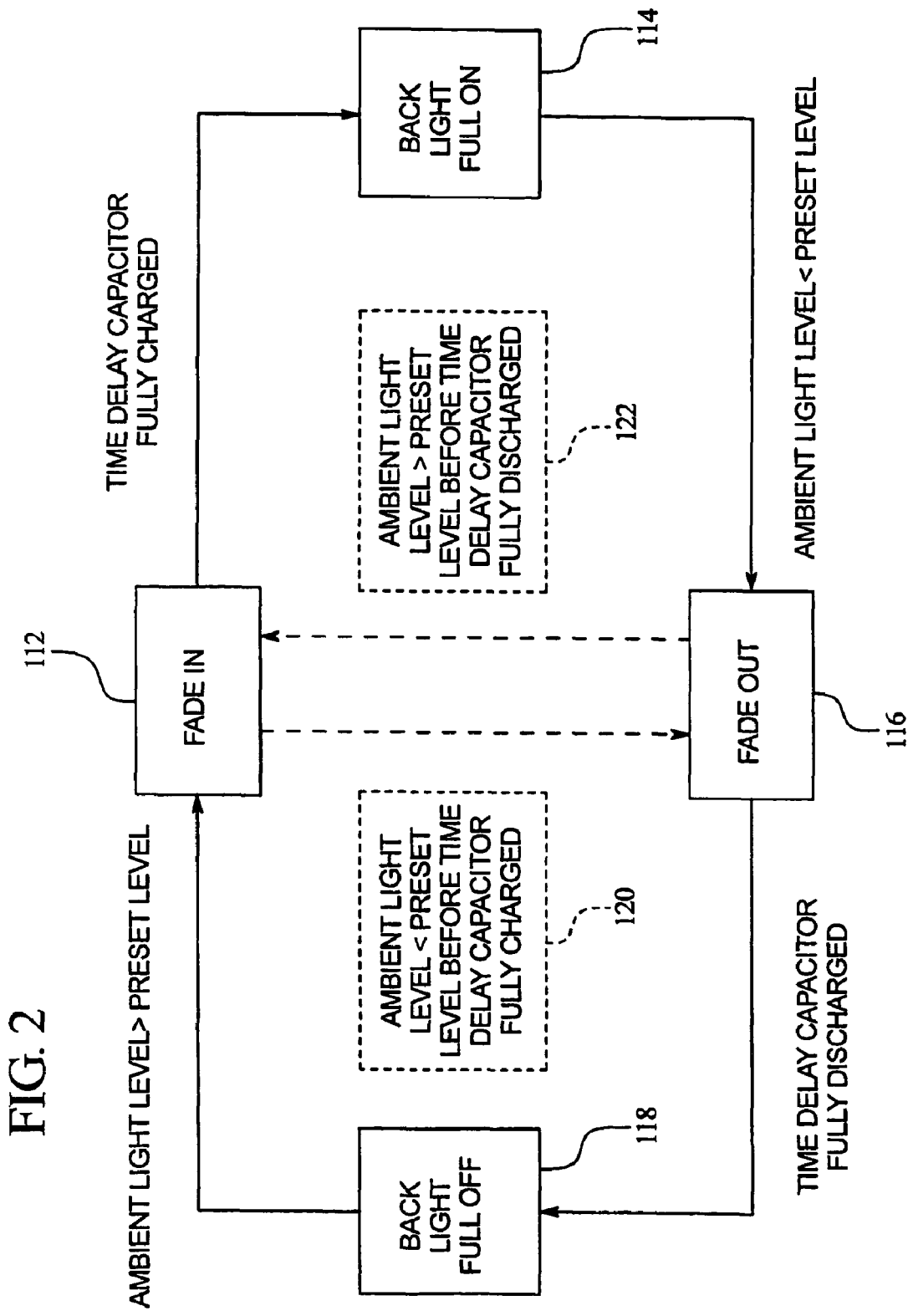
FIG. 2 is a schematic block diagram illustrating the operation of the light display system of the handheld video game device of FIG. 1.
Figure 3:
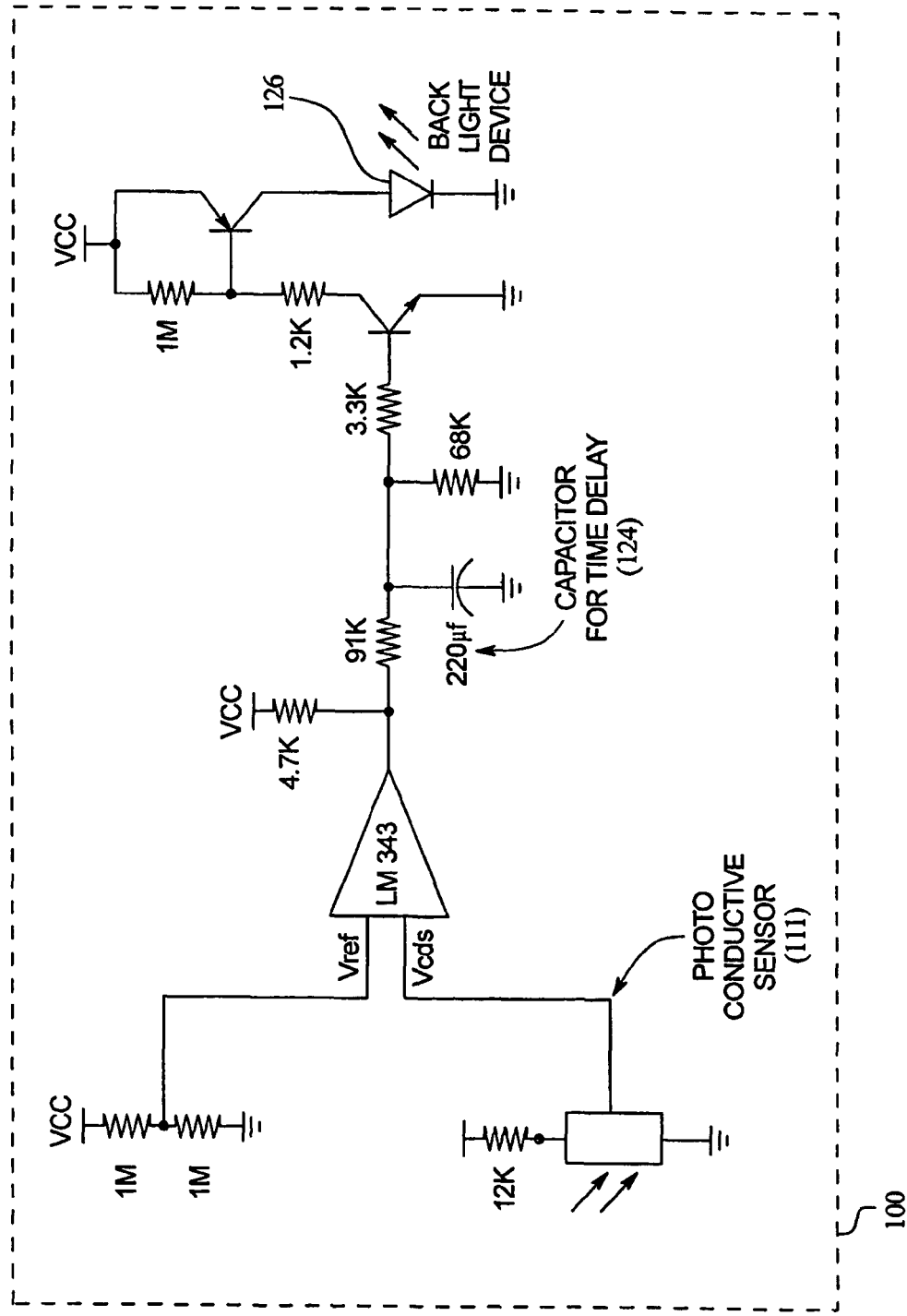
FIG. 3 is a schematic diagram of the electronic configuration of the light display system of the handheld video game device of FIG. 1.

Referring now to FIGS. 1, 2 and 3, in one embodiment of the present invention, a display illumination system, including a lighting device or light source such as backlight device 126, is employed in a handheld video game device 100. While the light source is preferably a backlight device 126, any suitable light source can be used. The handheld video game device 100 includes a housing 103, a processor mounted in the housing and a display mounted to the housing and controlled by the processor. It should be understood that a processor can be any suitable electronic circuit. The display is preferably a video display or video screen 102; however it can be any other suitable display device. Preferably, the handheld video game device 100 also includes a plurality of inputs 104, 106, 108 and 110, which are mounted to the housing and controlled by the processor, and a photoconductive sensor or light sensor 111 which is mounted on a surface of the housing or positioned in any other suitable location. The photoconductive sensor or light sensor 111 is in communication with the processor and is adapted to detect an ambient light intensity level. Sensor 111 is also in communication with an illumination device such as backlight device 126 positioned adjacent to the screen 102 that is also in communication with the processor.

The illumination device, backlight device or backlight display 126 can be automatically adjusted such that the light intensity level of the video display or video screen enables players to view and play a game displayed by the handheld video game device in different ambient light conditions. Therefore, players are able to enjoy and play the games with little or no affect on their concentration or their ability to play the games.

In one embodiment, the display device or display screen 102 includes a Liquid Crystal Display (LCD) that displays the characters, symbols or images of a particular game when the game is operated by the handheld device. Preferably, the LCD is mounted to the housing 103 and is visible by a player from the front or top portion of the handheld device as illustrated in FIG. 1; however the LCD can be arranged in any suitable configuration. The LCD or display screen 102 may display black and white images, color images or any suitable combination of these colors or images. It should be appreciated that the display screen 102 does not necessarily need to be an LCD and may be any suitable display device or display screen.

Preferably, the backlight device 126 includes a conventional backlight device such the backlight devices available at video game stores or retailers; however, the backlight device 126 can be any suitable backlight device. The backlight device 126 is preferably internally mounted to the housing 103 of the handheld device 100; however the backlight device 126 can be configured in any suitable manner. Specifically, the backlight device 126 is positioned adjacent to and between the display device or display screen 102 of the handheld device 100 and the processor (i.e., printed circuit board, PC board or other suitable device). The processor activates the backlight device to increase the light intensity level of the display screen 102 in low or no light conditions. It should be appreciated that the light intensity level of the light emitted from the backlight device 126 is adjustable to any suitable light intensity level or to any desired light intensity level by the processor.

Preferably, the handheld device 100 includes a photoconductive sensor or light sensor 111 which is mounted to the housing 103; however, the photoconductive sensor or light sensor 111 is not necessarilty mounted (e.g., a remote sensor not mounted to the housing) and can be arranged in any other suitable manner. The handheld device preferably includes one photoconductive sensor 111, but can include any suitable number of photoconductive sensors 111. It should also be appreciated that the photo conductive sensor 111 may be mounted to any suitable location or locations on the housing 103. The photo conductive sensor may also be an independent sensor which is attachable to a surface of the housing 103.

The photoconductive sensor 111 detects or senses the ambient light intensity level and communicates the detected light intensity level to the processor. Then, the processor compares the detected light intensity level with a designated, pre-determined or preset light intensity level that is inputted or programmed into the processor during manufacturing of the handheld game device or any other suitable time. It should be noted that the player can specify the preset light intensity level. Further, the preset light intensity level could be derived or learned from the player's behavior (e.g., the player manually adjusting the display illumination in one or more ambient light circumstances). Preferably, the designated light intensity level is determined or set based on a desired or optimum light intensity level for viewing the display device or display screen of the handheld device 100 in low to no light conditions; however, the designed, predetermined or preset light intensity level can be set to any suitable light intensity level.

Preferably, the handheld device 100 includes a capacitor such as a time delay capacitor 124, which is mounted to the processor or PC board; however, the handheld device 100 can operate in accordance with various embodiments of the present invention without a capacitor such as the time delay capacitor 124. The time delay capacitor 124 can be any suitable capacitor. Preferably, the time delay capacitor 124 is electrically connected between the photo conductive sensor 111 and the backlight device 126 as illustrated in FIG. 3; however, the time delay capacitor 124 can be connected in any other suitable configuration or absent from the handheld device 100 entirely.

The time delay capacitor 124 receives the electrical signals from the photo conductive sensor (which indicates the ambient light intensity level) and adjusts the signals so that the backlight display gradually illuminates until the designated or desired light intensity level is reached. Therefore, the time delay capacitor prevents the backlight display from automatically illuminating to the highest light intensity level or brightest light setting such as what commonly occurs with the backlight device in a typical cellular phone or similar device. The gradual illumination of the display screen (i.e., LCD) enables the backlight device 126 to illuminate the display screen to several different light intensity levels.

Further, the gradual change in backlight level can make the change less noticeable to the game player and/or to others. Thus, the game player is less likely to be distracted from the game by abrupt backlight level changes, and backlight level changes are less likely to draw the attention of others. As a result, the backlight device enhances the visual display of the game and increases a player's enjoyment of the video game device.

Additionally, the gradual illumination of the backlight device efficiently utilizes the stored energy, such as the energy stored in one or more batteries inserted in the device, to operate the handheld device. This conserves energy and thereby enables the batteries, or other energy source that powers the handheld device, to last longer and enable players to play the games for a longer period of time while using the backlight device.

Preferably, after a player activates or turns the handheld device "on," the processor automatically causes the photoconductive sensor 111 to sense or detect the ambient light intensity level of the particular location or setting in which a player is using the handheld device, and automatically causes the backlight device or backlight display to automatically, gradually adjust the light intensity level of the display screen 102 according to the detected ambient light intensity level. However, it should be noted that operation of the photoconductive sensor 111 can be initiated and/or conducted manually or in any other suitable manner.

Preferably, the backlight device of the present invention continuously and gradually adjusts the light intensity level of the display screen of the video game device to a designated optimum light intensity level based on the detected ambient light conditions of the surroundings in which the player is playing a game operated by the handheld device; however, the light intensity level can be adjusted at regular intervals or in any other suitable manner. The present invention therefore enables players to continue to play games operated by the handheld device without interruption and at substantially optimum or ideal light intensity levels for viewing and playing the games on the display screen.

When the ambient light intensity level is less than the preset or designated light intensity level as shown in block 116, the processor gradually increases the light intensity level of the light emitted by the backlight device 126. Similarly, the processor gradually decreases the light intensity level of the light emitted by the backlight device 126 when the ambient light intensity level is greater than the designated or preset light intensity level as shown in block 112.

Further, when the ambient light intensity level is greater than the designated light intensity level, the processor causes the time delay capacitor to charge up. As a result, the backlight device gradually emits light and gradually illuminates the display screen 102. Once the capacitor is fully charged, the backlight device illuminates at the target illumination level (e.g., maximum illumination or another predetermined level). When the ambient light intensity level is less than or below the designated light intensity level, the processor causes the time delay capacitor to discharge. Once the capacitor is fully discharged, the backlight device illuminates at the target illumination level (e.g., no illumination or another predetermined level). Operating the handheld device in this manner saves significant power and enables the batteries or other energy source used to operate the video game device to last longer.

Referring now to FIG. 3, the preferred electrical or electronic configuration of the components of the handheld device is shown; however the components of the handheld device can have any suitable electrical or electronic configuration. The photo conductive sensor 111 is electrically connected to the time delay capacitor 124 which controls the illumination of the backlight device. The capacitor 124 is also electrically connected to the backlight device 126. Thus, the electrical signals indicating the ambient light intensity level sensed by the photoconductive sensor 111 are relayed or communicated to the backlight device 126 via electrical wires or any suitable electrical communication lines or means. The capacitor adjusts the time delay of the electrical signals to increase or decrease the light intensity level of the backlight device based on the ambient light intensity level detected or sensed by the photoconductive sensor 111 as described above. It should be appreciated that the electrical configuration of the present invention may include any suitable number of resistors, capacitors or other electrical components. Further, it should be appreciated that the display illumination system can be electrically or electronically separate from the system that controls the game.

Figure 4:
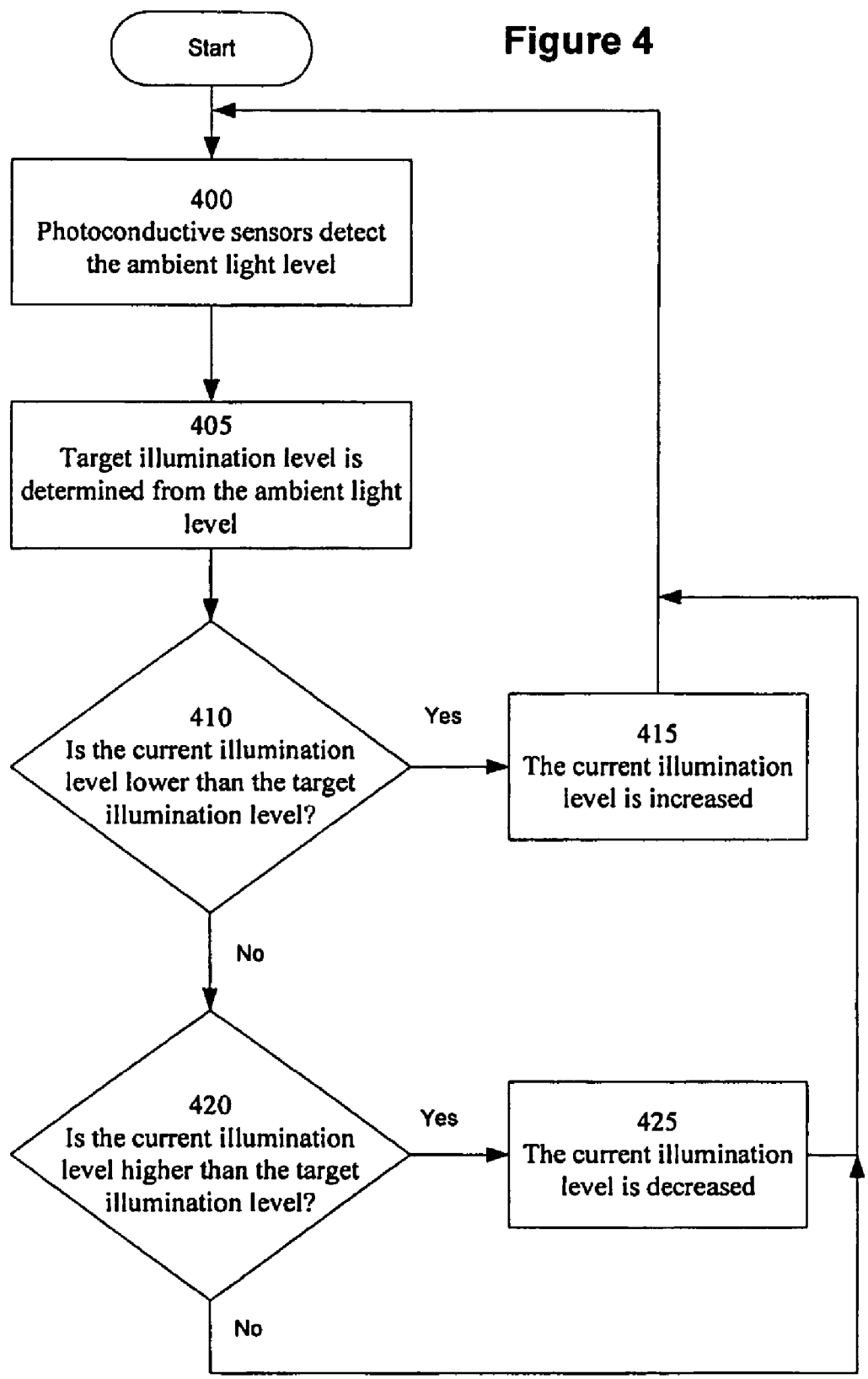
FIG. 4 is a flow diagram of the process of illuminating a display device in accordance with one embodiment of the present invention.
Figure 5:
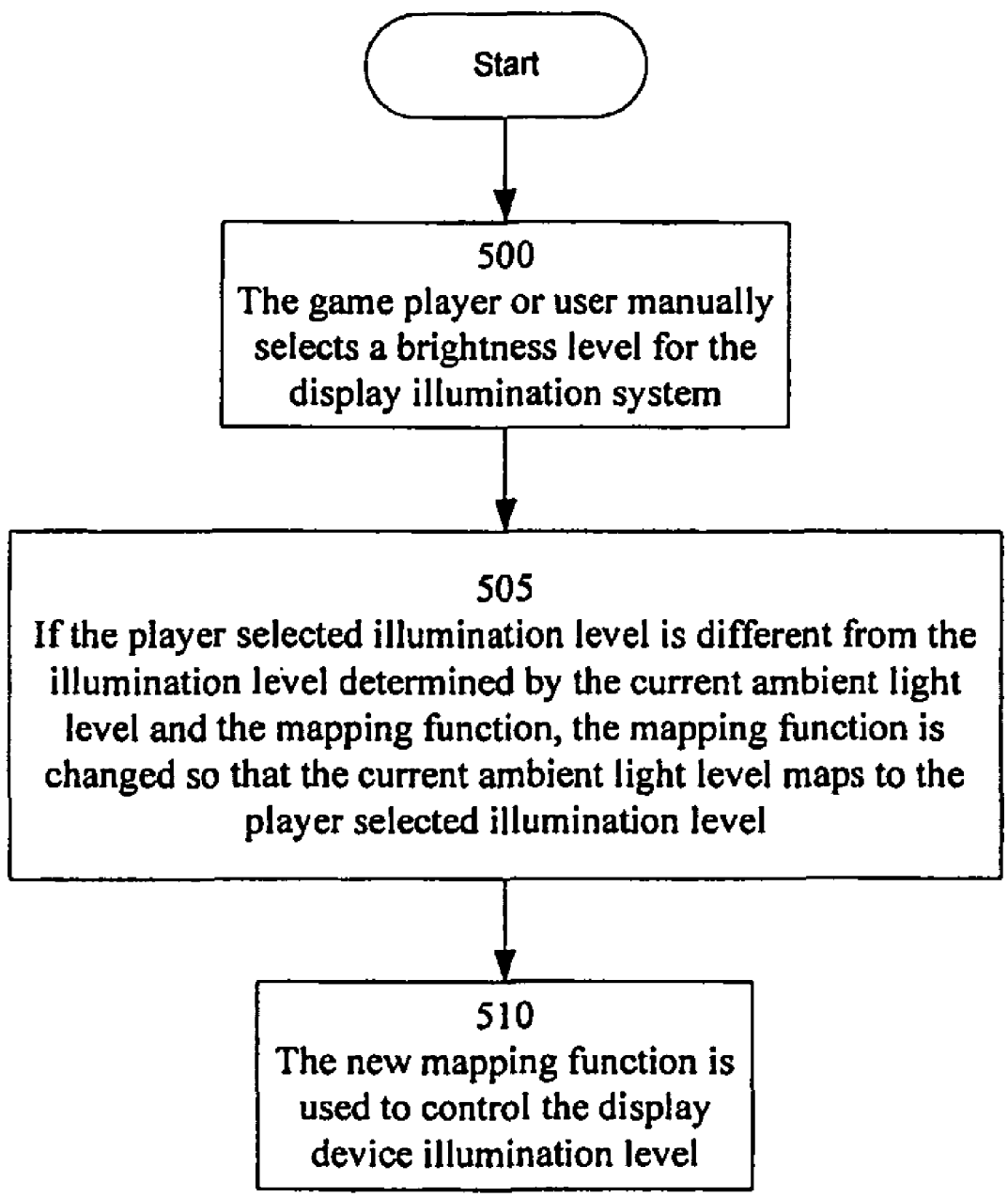
FIG. 5 is a flow diagram of the process of adjusting a mapping function when a display illumination level is manually adjusted in accordance with one embodiment of the present invention.

FIGS. 4 and 5 show the operation of an alternative embodiment in which the display and backlight device 126 (or any other display illumination device or method) are maintained to the extent possible at an effective brightness level. Both an ambient light scale and a backlight scale are determined. Preferably the ambient light scale ranges from no ambient light to the maximum detectable by the photoconductive sensors 111; however the ambient light scale can have any suitable range. Similarly, the backlight scale preferably ranges from off to maximally on; however, the backlight scale can have any suitable range. A mapping function maps ambient light values to backlight values. Preferably, the mapping function is linear; however the mapping function can be any suitable mapping from ambient light values to backlight values. It should be noted that backlighting is discussed for illustrative purposes and that any other illumination devices and/or methods can be used in accordance with alternative embodiments of the present invention.

As shown in FIG. 4, as the ambient light level detected by the photoconductive sensors 111 changes, the amount of light supplied by the display illumination or brightness system also changes. When a handheld video game device 100 is turned on, at step 400 the photoconductive sensors detect the ambient light level. From the ambient light level a target illumination level is determined (e.g., using the mapping function) at step 405. Then, at step 410, it is determined whether the current illumination level is lower than the target illumination level. If it is, the current illumination level is increased at step 415 and the process repeats at step 400. Preferably, the current illumination level is increased directly to the target illumination level; however, the current illumination level can be increased by an increment, by a gradual increase towards maximally on using a time delay capacitor 124 as described above, or in any other suitable manner.

If the current illumination level is not lower than the target illumination level, at step 420, it is determined whether the current illumination level is higher than the target illumination level. If it is, the current illumination level is decreased at step 425 and the process repeats at step 400. Preferably, the current illumination level is decreased directly to the target illumination level; however, the current illumination level can be decreased by an increment, by a gradual decrease towards off using a time delay capacitor 124 as described above, or in any other suitable manner. If the current illumination level is not higher than the target illumination level, the levels must be equal, so the level is not adjusted and the process repeats at step 400.

Additionally, the processor is preferably programmable to check the ambient light constantly or at specific time intervals, and repeats the process described above and shown in FIG. 4. Thus, if the ambient light level changes, the illumination level is adjusted only as much as needed (i.e., the amount indicated by the mapping function).

As shown in FIG. 5, the game player or user, preferably, can manually select a brightness level for the display illumination system at step 500. The selection is preferably made by moving a dedicated dimmer switch; however, the selection can be made using a combination of software and one or more general input devices (e.g., adjustment of various laptop monitors by invoking a display brightness adjustment mode and pressing the left/right or up/down cursor keys to raise or lower the brightness level) or any suitable selection device. It should be noted that the level selected by the game player or user can be sub-optimal for battery efficiency purposes.

Further, the level selected can be inconsistent with a mapping function given the current ambient light level. To reconcile this possible inconsistency, if the player selected illumination level is different from the illumination level determined by the current ambient light level and the mapping function, the mapping function is changed so that the current ambient light level maps to the player selected illumination level at step 505. Preferably, the function is changed by adding or subtracting a scalar value. For example, if the mapping function, map(x), maps the current ambient light level to an illumination level that is c units below the player selected illumination, the new mapping function, new_map (x), is map(x)+c. It should be noted that the new mapping function can be any suitable mapping function. Then, at step 510, the new mapping function is used to control the display device illumination level.

The handheld video game device 100 can also include an override mechanism that enables a user to specify that the display illumination level should not change even if the ambient light level changes. Further, the mapping function and/or preset light intensity level can be programmed using any suitable means. Thus, a user can specify the exact display illumination behavior desired in any number or range of ambient light intensity levels.

It should be appreciated that the present invention is not limited to video game devices such as handheld video game devices and may be employed in any suitable devices such as personal digital assistants, portable computers or lap top computers, blackberry devices, cellular phones, portable DVD players or any other suitable electronic, electrical, video display device or other suitable display device which utilizes a display screen to display images, symbols, characters or other data or information to a user.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An electronic device, comprising:
   a housing;
   a display device coupled to the housing;
   an illumination device located proximate to the display device, the illumination device operable to emit light;
   a light sensor coupled to the housing, the light sensor operable to detect an ambient light level relative to the housing; and
   electrical circuitry operable to:
   (a) determine a first light intensity level based on a first detected ambient light level and a mapping function;
   (b) cause the illumination device to gradually modify a current illumination level until the first light intensity level is achieved;
   (c) receive an input of a second light intensity level from a user;
   (d) modify the illumination level of the light emitted by the illumination device to the second light intensity level based on the input from the user in the first ambient light level; and
   (e) modify the mapping function based on the input from the user, the modified mapping function being useable for different ambient light levels detected by the light sensor.

2. The electronic device of claim 1, wherein said electrical circuitry causes said illumination device to illuminate substantially at the second light intensity level by gradually decreasing the current illumination value.

3. The electronic device of claim 1, wherein said electrical circuitry determines the first light intensity level when said electrical circuitry determines the first detected ambient light level exceeds a preset value.

4. The electronic device of claim 1, wherein said electrical circuitry determines the first light intensity level when said electrical circuitry determines the first detected ambient light level is less than a preset value.

5. The electronic device of claim 1, wherein the first light intensity level is selected from the group consisting of a minimum illumination value, a maximum illumination value, and an intermediate illumination value wherein the intermediate illumination value is between the maximum illumination value and the minimum illumination value.

6. The electronic device of claim 1, wherein said electronic device is selected from the group consisting of a video game device, a handheld video game device, a personal digital assistant, a laptop computer, a cellular phone, a portable DVD player, and a computer.

7. The electronic device of claim 1, further comprising an illumination level adjustment input device coupled to said electrical circuitry wherein said electrical circuitry is operable to:
   determine a third light intensity level based at least partly on a detected ambient light level and at least one player determined adjustment value received from said illumination level adjustment input device at a different detected ambient light level; and
   cause said illumination device to automatically illuminate at substantially the third light intensity level.

8. The electronic device of claim 7, wherein the modified mapping function maps the detected ambient light level to the third light intensity level.

9. The electronic device of claim 1, wherein the modification of the mapping function by the electrical circuitry includes one of adding or subtracting a value to the mapping function used to determine the first light intensity level.

10. The electronic device of claim 1, wherein the electrical circuitry is operable to use the modified mapping function to control the illumination level of the light emitted by the illumination device.

11. A method of illuminating a display of an electronic device, comprising the steps of:
sensing, by a sensor, an ambient light level relative to the electronic device;
determining a first illumination level for the display using a mapping function based on the sensed ambient light level;
causing an illumination device to emit illumination at the first illumination level;
receiving an input from a player of a second illumination level; and
modifying the mapping function so that the second illumination level is associated with the sensed ambient light level.

12. The method of claim 11, wherein the step of modifying the mapping function includes one of the addition or subtraction of a value to the mapping function used to determine the first illumination level.

13. The method of claim 11, wherein the ambient light level is a first ambient light level, and the method further comprises the steps of:

sensing, by a sensor, a second ambient light level different from the first ambient light level; and
determining a third illumination level for the display using the modified mapping function based on the second ambient light level.

14. A method of illuminating a video game device display comprising:
replacing an initial light intensity level associated with a linear mapping function by storing a player selected light intensity level of an illumination device that is associated with a modified linear mapping function for at least one ambient light intensity level;
detecting an ambient light intensity level with a light sensor; and
if the detected ambient light intensity level matches the stored at least one ambient light intensity level, automatically causing the illumination device to adjust the light intensity level at a predetermined rate until the player selected light intensity level of the illumination device is achieved.

15. The method of claim 14, wherein the detected ambient light intensity level is a first ambient light intensity level, and the method further comprises the steps of:
detecting a second ambient light intensity level with the light sensor; and
using the modified mapping function to determine a light intensity level based on the second ambient light intensity level.

* * * * *